United States Patent [19]

Dave et al.

[11] Patent Number: 4,889,727

[45] Date of Patent: * Dec. 26, 1989

[54] USING COCOA POWDER TO ENHANCE THE FLAVOR OF SYNTHETIC CHEWING GUM BASE

[75] Inventors: Jayant C. Dave, Bloomingdale; David W. Record, River Forest; Jill M. Nespor, LaGrange; Jeffrey S. Hook, Palos Hills, all of Ill.

[73] Assignee: Wm. Wrigley Jr. Company, Chicago, Ill.

[*] Notice: The portion of the term of this patent subsequent to Dec. 26, 2006 has been disclaimed.

[21] Appl. No.: 240,832

[22] Filed: Sep. 2, 1988

[51] Int. Cl.[4] .............................................. A23G 3/30
[52] U.S. Cl. .......................................... 426/3; 426/6; 426/631; 426/650
[58] Field of Search ...................... 426/3, 4, 5, 6, 593, 426/631

[56] References Cited

U.S. PATENT DOCUMENTS

| | | | |
|---|---|---|---|
| 1,206,467 | 11/1916 | Reid. | |
| 1,786,831 | 12/1930 | Dellenbarger. | |
| 2,224,637 | 12/1940 | Mahle | 99/135 |
| 2,366,589 | 1/1945 | Borglin | 260/100 |
| 3,062,662 | 11/1962 | McDonald | 99/138 |
| 3,826,847 | 7/1974 | Ogawa et al. | 426/3 |
| 4,224,345 | 9/1980 | Tezuka et al. | 426/3 |
| 4,514,423 | 4/1985 | Tezuka et al. | 426/3 |
| 4,604,287 | 8/1986 | Glass et al. | 426/5 |

*Primary Examiner*—Donald E. Czaja
*Assistant Examiner*—Evan Federman
*Attorney, Agent, or Firm*—Willian Brinks Olds Gilson & Lione

[57] ABSTRACT

The present invention includes a method of enhancing the flavor of synthetic chewing gum base by the addition of a minor amount of cocoa powder to the base itself or to the chewing gum in which the base is used. Whether the cocoa powder is added to the gum base or to the chewing gum, the amount of cocoa powder should be between about 0.3 and 2.4 percent by weight of the gum base. The invention also includes the synthetic chewing gum base or a chewing gum with a synthetic gum base with cocoa powder added in a minor amount to enhance the flavor of the gum base. The synthetic gum base of the present invention is substantially free of natural gum products and includes between about 10 and about 30 percent of a synthetic elastomer; between about 20 and about 70 percent of a synthetic resin; and between about 0.3 and about 2.4 percent cocoa powder.

22 Claims, No Drawings

USING COCOA POWDER TO ENHANCE THE FLAVOR OF SYNTHETIC CHEWING GUM BASE

BACKGROUND OF THE INVENTION

The present invention relates to chewing gum bases and methods for producing them. More particularly, the invention relates to an improvement in the flavor profile of synthetic chewing gum bases.

A major ingredient of chewing gum is the gum base, i.e. the insoluble portion of the gum which remains in the mouth and has a pleasant chewing texture.

Since the late 1800's chewing gum has been manufactured with a gum base containing chicle. To this day, chicle is still produced from the latex of the red and white Sapodilla trees which grow in the rain forests of Mexico and Guatemala. Although the supply of chicle is regulated by the governments of these countries, the supply of chicle has become more and more scarce in the last decade due to the fact that replanting efforts have been unsuccessful. In the article "Use of Terpene Resins as Basic Chewing Gum Components" by Y. Sata et al., published in Soko no Kagaku, Vol. 93, pp. 82–89, 1985, it was estimated that the amount of chicle exported in 1984 was only 22 percent of that exported in 1975.

Other natural resins have also been used in the manufacture of gum base. For example jelutong and Sorva are natural resins collected from trees of the family Apocynaceae grown in Southeast Asia. Other natural resins include nispero, tunu, niger gutta, chiquibul. However, like the supply of chicle, the supplies of these other natural resins have also been dwindling in the last decade.

Synthetic resins, such as polyvinyl acetate, and synthetic elastomers, such as polyisobutylene, have been incorporated into chewing gums for several years. Over the years, these synthetic compounds have been greatly refined in order to provide the exact physical properties needed in various types of chewing gum. For the most part, these synthetic compounds have very little if any flavor. At present, some chewing gum products are manufactured with bases having the natural resins supplemented with synthetic compounds. Other chewing gum products are manufactured with a base having no natural resins at all.

One disadvantage of replacing all of the natural resins in a chewing gum product is that it causes a change in the flavor profile of the gum base, and thus effects the flavor of the chewing gum. In particular, it is believed that the natural resins include trace quantities of compounds, including impurities, that have an effect on the overall flavor of the gum base. As a result, natural gum base is typically perceived as richer, deeper, and more earthy than a synthetic gum base.

The problems caused by this flavor change are exacerbated if the particular chewing gum product is one that has been on the market for several years and thus has a long-standing standard flavor.

SUMMARY OF THE INVENTION

The present invention includes a method of enhancing the flavor of synthetic chewing gum base by the addition of a minor amount of cocoa powder to the base itself or to the chewing gum in which the base is used. The present invention also includes the chewing gum containing a synthetic gum base and a minor amount of cocoa powder. Whether the cocoa powder is added to the gum base or to the chewing gum, the amount of cocoa powder should be between about 0.3 and 2.4 percent by weight of the gum base.

The invention further includes the synthetic chewing gum base with cocoa powder added in a minor amount to enhance the flavor of the gum base. The synthetic gum base of the present invention is substantially free of natural gum products and includes between about 10 and about 30 percent of a synthetic elastomer; between about 20 and about 70 percent of a synthetic resin; and between about 0.3 and about 2.4 percent cocoa powder.

In accordance with a preferred embodiment of the present invention, the synthetic chewing gum base also includes a plasticizer and a filler. The embodiment preferably includes between about 10 and about 20 percent synthetic rubber (elastomer), between about 10 and about 35 percent polyterpene resins, between about 10 and about 35 percent polyvinyl acetate, between about 10 and about 40 percent of a plasticizer consisting of waxes, fats, and oils, between about 5 and about 30 percent calcium carbonate filler, and between about 0.3 and about 1.2 percent cocoa powder.

At the relatively low level at which the cocoa powder is used in the present invention, it should not contribute a chocolate flavor to the gum base. However, it has been found that at this low level the cocoa powder contributes to the overall flavor of the synthetic gum base in such a way as to make the synthetic gum base taste more like a natural gum base. This flavor approximation effect is advantageous because it allows a chewing gum manufacturer to convert from a natural base to a synthetic gum base without significant alteration of the flavor profile of the chewing gum.

As used in this specification and the appended claims, the term "synthetic base" is intended to refer to a gum base which is made with synthetic elastomers and resins and is thus substantially free of natural gum products. Likewise, the term "natural gum products" is intended to refer to those naturally derived gums and resins which have traditionally been used in chewing gum manufacture such as chicle, jellutong, nispero tunu, sorva, niger gutta, massaranduba belata, and chiquibul. (A more complete list is available in the Code of Federal Regulation Section 172.615)

Unless otherwise noted, all percentages in this specification and the appended claims are percentages by weight.

DETAILED DESCRIPTION OF THE PREFERRED EMBODIMENTS

Chewing gum bases generally comprise a combination of elastomers and resins together with plasticizers and inorganic fillers. In accordance with one product aspect of the present invention, the gum base is substantially free of natural gum products and contains a synthetic elastomer, a synthetic resin, and a minor amount of cocoa powder. In accordance with the method aspect of the present invention, the cocoa powder is preferably added directly to the other ingredients during formulation of the gum base. Alternatively, the cocoa powder can be added to the chewing gum during formulation of the chewing gum itself.

The cocoa powder used in the present invention can be any of the various types. Preferably, the cocoa powder is made according to the Dutch process wherein the nib is soaked in a warm alkali solution before being ground and pressed.

The fat and moisture content of the cocoa powder is seen as noncritical to the present invention so long as the fat and moisture added through the cocoa do not interfere with the textural properties of the gum base.

A cocoa powder suitable for use in the most preferred embodiment is obtained from the Blommer Chocolate Co. of Chicago, Ill. under the designation "Sudan Dutch Process Cocoa." This particular cocoa powder has a fat content of 10–12 percent. Another supplier of suitable cocoa powder is Gil & Duffus Products, Inc.

The amount of cocoa powder added to the synthetic gum base should be between about 0.3 and about 2.4 percent. This range is important to the present invention. In particular, it is important that the amount of cocoa powder be kept below the level at which it would impart a noticeable chocolate flavor to the gum base. It is also important that the amount of cocoa be above a level at which the flavor enhancement effect is detectable. Preferably, the level of cocoa powder is between about 0.3 and about 1.2 percent. Most preferably, the level of cocoa powder is about 0.6 percent.

Synthetic elastomers may include polyisoprene, polyisobutylene, isobutylene-isoprene copolymer, styrene butadiene rubber, and the like. Of these, polyisoprene, polyisobutylene and isobutyleneisoprene copolymer are preferred, with the copolymer being the most preferred. A copolymer obtained from Exxon Corp. under the designation "butyl rubber" is suitable for use in the most preferred embodiment.

The amount of synthetic elastomer used in the gum base can be varied between about 10 and about 20 percent depending on the specific elastomer selected and on the physical properties desired in the final gum base. For example, the viscosity, softening point, elasticity can be varied. When butyl rubber is used, it is preferred to include between about 10 and about 20 percent and most preferred to use about 12 percent.

Synthetic resins include polyvinyl acetate, polyethylene, ester gums, (resin esters of glycerol) and polyterpenes. Of these, polyterpenes, polyethylene and polyvinyl acetate are preferred, with a combination of polyvinyl acetate and polyterpenes being most preferred. A polyvinyl acetate obtained from MONSANTO under the designation "Gelva" is a suitable polyvinyl acetate for use in the most preferred embodiment. A polyterpene obtained from HERCULES under the designation "Piccolyte" is suitble for use in the most preferred embodiment.

As with the synthetic elastomer, the amount of synthetic resin used in the gum base can be varied depending on the particular resin selected and on the physical properties desired in the final gum base.

Preferably, the synthetic gum base of the present invention also includes plasticizers selected from the group consisting of fats, oils, waxes, and mixtures thereof. The fats and oils can include tallow, hydrogenated and partially hydrogenated vegetable oils, and cocoa butter. Commonly employed waxes include paraffin, microcrystalline and natural waxes such as beeswax and carnauba.

The most preferred embodiment uses a mixture of paraffin wax and partially hydrogenated vegetable oil and glycerol monostearate.

The amount of plasticizers used can vary between about 10 and about 40 percent. In the most preferred embodiment, the total plasticizer includes paraffin wax at about 13 percent and cottonseed oil at about 2 percent, and glycerol monostearate at about 6 percent.

Preferably, the gum base also includes a filler component. The filler component is preferably selected from the group consisting of calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Further, gum bases may also contain optional ingredients such as antioxidants, colors, and emulsifiers.

These ingredients of the gum base can be combined in a conventional manner. In particular, the synthetic elastomer, synthetic resins, plasticizers, filler, and the cocoa powder can be added to a mixing vessel. The ingredients are typically softened by heating and then mixed for a time sufficient to insure a homogenous mass. The mass can be formed into slabs, or pellets and allowed to cool before use in making chewing gum. Alternatively, the molten mass can be used directly in a chewing gum making process.

Typically, the gum base constitutes between about 5 to about 95 percent by weight of the gum. More preferably the insoluble gum base comprises between 10 and 50 percent by weight of the gum and most preferably about 20 to about 35 percent by weight of the gum.

The remainder of the chewing gum ingredients are seen to be noncritical to the present invention. That is, the chewing gum base of the present invention can be incorporated into conventional chewing gum formulations in a conventional manner.

As mentioned above, the preferred method of enhancing the flavor of the synthetic gum base is to add cocoa powder directly to the gum base at a level of between 0.3 and 2.4 percent. Alternatively, the cocoa powder can be added to the gum base with the remainder of the chewing gum ingredients. In this alternative embodiment, the amount of cocoa powder should likewise be between about 0.3 and about 2.4 percent by weight of the synthetic gum base.

In general, a chewing gum composition typically comprises a water soluble bulk portion and a water insoluble chewable gum base portion and, typically water insoluble flavoring agents. The water soluble portion dissipates with a portion of the flavoring agent over a period of time during chewing, while the gum base portion is retained in the mouth throughout the chew.

The water soluble portion of the chewing gum may further comprises softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum. Preferably, the chewing gum contains about 1 percent glycerine.

Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination. In the preferred embodiment, the water soluble sweetener portion is a mixture of sugar at about 50 percent of the final chewing gum, dextrose monohydrate at about 10 percent, and corn syrup at about 17 percent.

In alternative embodiments, the invention can be used in a sugarless chewing gum. Generally sugarless sweeteners include components with sweetening characteristics but are devoid of the commonly known sugars and comprise but are not limited to high-potency sweeteners and/or sugar alcohols. Suitable high-potency sweeteners include aspartame, alitame, salts of acesulfame, saccharin and its salts, cyclamic acid and its salts, glycyrrhizin, sucralose, thaumatin, and monellin, as well as combinations thereof. Suitable sugar alcohols include sorbitol, mannitol, xylitol, hydrogenated starch hydrolysates, maltitol, and the like, as well as combinations thereof. Preferably, the sugarless gum embodiment of the present invention comprises a combination of a high-potency sweetener with a sugar alcohol, most preferably aspartame with sorbitol.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixture thereof including but not limited to oils derived from plants and fruits such as citrus oils, fruit essences, peppermint oil, spearmint oil, clove oil, wintergreen, anise, and the like. Artificial flavoring components are also contemplated. Those skilled in the art will recognize that natural and artificial flavoring agents may be combined in any sensorally acceptable blend. All such flavors and flavor blends are contemplated by the present invention. In the preferred embodiment, the flavor is spearmint oil added at about 0.6 percent by weight of the chewing gum.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

EXAMPLES

EXAMPLES 1-4

Examples 1-4 were carried out to determine the effects of using different types of cocoa powder to enhance the flavor a synthetic gum base. First a batch of a synthetic base was made with the following formula.

|  | wt. % |
| --- | --- |
| Polyvinyl acetate | 27 |
| Synthetic rubber | 12 |
| Paraffin wax | 13 |
| Cottonseed Oil | 2 |
| Glycerol Monostearate | 5 |
| Terpene resin | 27 |
| Calcium Carbonate filler | 11 |
| Lecithin | 3 |
|  | 100% |

In each of Examples 1-4, 0.225 g. of different types of cocoa powder were added to 49.775 g. of the synthetic base, thus giving a level of cocoa powder of 0.45 percent. Example 1 used a cocoa powder sold by Gil & Duffus Products, Inc. under the designation "10/12 Dutch, type 7357 D." Example 2 used a Dutch cocoa from the same manufacturer under the designation "10/12 Dutch type A". Example 3 used a Dutch cocoa from the same manufacturer under the designation "10/12 Dutch type D". Example 4 used a Natural cocoa from the same manufacturer under the designation "10/12 NAT type A". After mixing the cocoa powder in, the gum base was allowed to cool.

Sensory tests were conducted to determine the flavor effect of the cocoa powder. In particular, the cocoa powder containing formulations were compared to the same synthetic base without cocoa powder and to a natural gum base having the following formula:

|  | wt. % |
| --- | --- |
| Jelutong | 11.4 |
| Sorva | 9.0 |
| Synthetic Elastomer | 8.6 |
| Resins and Ester gums | 17.5 |
| Polyvinyl acetate | 15.0 |
| Paraffin Wax | 11.2 |
| Calcium Carbonate | 16.0 |
| Vegetable Oils | 5.6 |
| Glycerol Monostearate | 5.7 |
|  | 100% |

This natural base composition was used for comparative purposes in Examples 1-4, Example 10, and Example 16.

A group of expert panelists chewed pieces of the natural base, the synthetic base, and the synthetic base with cocoa powder from one of Examples 1-4. The expert panelists were then asked to determine whether the base with cocoa powder tasted more like the synthetic or the natural base. The results showed that the base from each of Examples 1-4 had a flavor more like the natural base than the synthetic base without cocoa. The panelists commented that the synthetic base with cocoa powder had a deeper, richer, sweeter, more honey like taste similar to the natural base. The panelists also commented that the gum base from Examples 1 and 2 were the most like the natural base.

EXAMPLES 5-8

For convenience in mixing the cocoa powder for the following examples, 1000 g. of the Sudan Dutch Process Cocoa from Blommer Chocolate Co. was mixed with 1000 g. of the synthetic base described above. This 1:1 mixture was then cooled and formed into pellets.

Example 5 was made with 0.31% of the mixed pellets and 99.69% of the synthetic base. The resultant base therefore had 0.15% cocoa powder.

Example 6 was made with 0.62% of the mixed pellets and 99.38% of the synthetic base. The resultant base therefore had 0.31% cocoa powder.

Example 7 was made with 1.24% of the mixed pellets and 98.76% of the synthetic base. The resultant base therefore had 0.62% cocoa powder.

Example 8 was made with 2.48% of the mixed pellets and 97.52% of the synthetic base. The resultant base therefore had 1.24% cocoa powder.

The gum bases made in Examples 5-8 tested by panelists as was done with Examples 1-4. In the comparisons, it was found that the gum base of Example 5 had only a slight change from the all synthetic base. Example 6 had significant flavor enhancement, i.e. was reported to taste more like the natural base. Accordingly, the cocoa powder should be present in the gum base at least about 0.3 percent. The gum base of Example 7 was reported to be the most like the natural base, i.e. having a mildly sweet, earthy, deeper flavor than the all synthetic base. The gum base of Example 8 was reported to have the same flavor character of that of Example 7. Some of the panelists noted of a rather slight chocolate flavor. However, it is noted that in this sensory test, the gum base was chewed by itself, i.e. without any sweeteners or flavors. As shown in Examples 13 and 14 below, when the gum base is incorporated into a chewing gum, a higher level of cocoa powder can be used without detecting a chocolate

EXAMPLES 9-14

In Examples 9-14, various formulations of chewing gum base were made into a spearmint flavored gum and then compared as above. In each of the examples, the chewing gum base was 20.7 percent of the chewing gum. The remainder of the chewing gum formulation was as follows:

|  | wt. % |
|---|---|
| Sugar | 50.8 |
| Dextrose Monohydrate | 10.1 |
| 39 DE Syrup | 16.9 |
| Glycerin | 0.9 |
| Spearmint Flavor | 0.6 |
| Total | 79.3 |

The spearmint flavor was a blend of natural spearmint oils.

For purposes of comparison, Example 9 was made with all synthetic base as described above.

Likewise, Example 10 was made with a natural base as described above.

Example 11 was made with 20.575% of the synthetic base described above and 0.125% of the mixed pellets (1:1 cocoa powder to synthetic base as described above). The cocoa powder was thus present at 0.3% by weight of the base and at 0.06% of the chewing gum.

Example 12 was made with 20.45% of the synthetic base described above and 0.25% of the mixed pellets. The cocoa powder was thus present at 0.6% by weight of the base and at 0.125% of the chewing gum.

Example 13 was made with 20.19% of the synthetic base described above and 0.51% of the mixed pellets. The cocoa powder was thus present at 1.23% by weight of the base and at 0.255% of the chewing gum.

Example 14 was made with 19.7% of the synthetic base described above and 1.0% of the mixed pellets. The cocoa powder was thus present at 2.4% by weight of the base and at 0.5% of the chewing gum.

Sensory tests similar to those described above were performed on the chewing gum of these Examples. In particular, five expert panelists chewed pieces of gum made in the comparative Examples 9 and 10 and thereafter chewed pieces made in each of the examples 11-14. When asked to determine whether the chewing gum was more like that made with natural or synthetic base, the following results were recorded:

| Panelist | Ex. 11 | Ex. 12 | Ex. 13 | Ex. 14 |
|---|---|---|---|---|
| A | N | N | N | S-C |
| B | S | N | N | N |
| C | S | S | N | N |
| D | N | N | N | N-C |
| E | S | S | N | N |

N = Panelist noted that the flavor of the gum of the example was closer to that of the gum made in Example 10 with the natural base.
S = Panelist noted that the flavor of the gum of the example was closer to that of the gum made in Example 9 with the synthetic base.
C = Panelist noted a slight chocolate flavor.

These results show that at levels of 0.3% to about 2.4% cocoa powder in the gum base, cocoa powder gives gum made with synthetic base a flavor character similar to gum made with a natural base. Example 14 also shows that about 2.4% cocoa powder in the gum base was the level at which some of the expert panelists were able to detect a slight chocolate flavor. Accordingly, about 2.4 percent cocoa powder in the chewing base is the maximum that should be used.

EXAMPLES 15-18

Examples 15-18 were performed the same as Examples 9-14 except that a fruit flavored chewing gum was used to determine if the flavor enhancement effect of the cocoa powder could also be detected in a non-mint flavored chewing gum. In each of these examples, the gum base was included at 19.3 percent. The remainder of the formulation was as follows:

|  | wt. % |
|---|---|
| Sugar | 55.1 |
| Dextrose Monohydrate | 7.3 |
| 39 DE Syrup | 16.7 |
| Glycerin | 0.9 |
| Fruit Flavor | 0.7 |
| Total | 79.3 |

The fruit flavor was a blend of natural oils and synthetic aroma chemicals.

Again for purposes of comparison, Example 15 was made with all synthetic base as described above and without the addition of cocoa powder.

Likewise, Example 16 was made with all natural base as described above.

Example 17 was made with 19.05% of the synthetic base described above and 0.25% of the mixed pellets (1:1 cocoa powder to synthetic base as described above). The cocoa powder was thus present at 0.65% by weight of the base and at 0.125% of the chewing gum.

Example 18 was made with 18.8% of the synthetic base described above and 0.50% of the mixed pellets.

The cocoa powder was thus present at 1.30% by weight of the base and at 0.25% of the chewing gum.

Pieces of the chewing gum of these examples were compared as described above with the following results:

| Panelist | Ex. 17 | Ex. 18 |
|----------|--------|--------|
| A | N | N |
| B | S | N |
| C | N | N |
| D | N | N |
| E | N | N |

N = Panelist noted that the flavor of the gum of the example was closer to that of the gum made in Example 16 with the natural base.
S = Panelist noted that the flavor of the gum of the example was closer to that of the gum made in Example 15 with the synthetic base.

These results show that a fruit flavored chewing with a synthetic gum base is also benefited by the addition of a minor amount of cocoa powder.

In summary, a relatively simple and inexpensive method for enhancing the flavor of synthetic chewing gum bases has been described. Although specific embodiments and examples have been described herein, it should be borne in mind that these have been provided by way of explanation and illustration and that the present invention is not limited thereby. Certainly modifications which are within the ordinary skill in the art to make are considered to lie within the scope of the invention as defined by the following claims, including all equivalents.

I claim:

1. A synthetic non-chocolate flavored chewing gum base comprising:
    between about 10 and about 30 percent of a synthetic elastomer;
    between about 20 and about 70 percent of a synthetic resin;
    between about 0.3 and about 2.4 percent cocoa powder;
    wherein said synthetic chewing base is substantially free of natural gum products.

2. The chewing gum base of claim 1 wherein the cocoa powder is present in an amount between about 0.3 and about 1.2 percent.

3. The chewing gum base of claim 1 wherein the cocoa powder is present at about 0.6 percent.

4. The chewing gum base of claim 1 wherein the synthetic elastomer is selected from the group consisting of polyisoprene, polyisobutylene, isobutyleneisoprene copolymer, styrene butadiene rubber as well as combinations thereof.

5. The chewing gum base of claim 1 wherein the synthetic resin is selected from the group consisting of polyvinyl acetate, polyethylene, ester gums, polyterpenes, as well as combinations thereof.

6. A synthetic non-chocolate flavored chewing gum base comprising:
    between about 10 and about 30 percent polyisoprene;
    between about 10 and about 35 percent polyterpene;
    between about 10 and about 35 percent polyvinyl acetate;
    between about 10 and about 40 percent plasticizers selected from the group consisting of waxes, fats, oils, and combinations thereof;
    between about 5 and about 50 percent filler selected from the group consisting of calcium carbonate, magnesium carbonate, talc, dicalcium phosphate, and combinations thereof; and
    between about 0.3 and about 2.4 percent cocoa powder.

7. A method of making a synthetic non-chocolate flavored chewing gum base substantially free of natural gum products, the method including the steps of:
    adding between about 10 and about 30 percent of a synthetic elastomer;
    adding between about 20 and about 70 percent of a synthetic resin;
    adding between about 0.3 and about 2.4 percent cocoa powder; and
    heating and mixing said synthetic elastomer, synthetic resin, plasticizer, filler, and cocoa powder until well blended.

8. The method of claim 7 wherein the cocoa powder is present in an amount between about 0.3 and about 1.2 percent.

9. The method of claim 7 wherein the cocoa powder is present at about 0.6 percent.

10. The method of claim 7 wherein the synthetic elastomer is selected from the group consisting of polyisoprene, polyisobutylene, isoprene-isobutylene copolymer, styrene butadiene rubber, as well as combinations thereof.

11. The method of claim 7 wherein the synthetic resin is selected from the group consisting of polyvinyl acetate, polyethylene, ester gums, polyterpenes, as well as combinations thereof.

12. A non-chocolate flavored chewing gum comprising:
    between about 10 and about 50 percent by weight of a synthetic chewing gum base substantially free of natural gum products, said synthetic chewing gum base comprising:
    between about 10 and about 30 percent of a synthetic elastomer;
    between about 20 and about 70 percent of a synthetic resin;
    a sweetener;
    a flavoring agent; and
    between about 0.3 and about 2.4 percent cocoa powder by weight of the synthetic gum base.

13. The chewing gum of claim 12 wherein the cocoa powder is present in an amount between about 0.3 and about 1.2 percent by weight of the synthetic gum base.

14. The chewing gum of claim 12 wherein the cocoa powder is present at about 0.6 percent by weight of the synthetic gum base.

15. The chewing gum of claim 12 wherein the synthetic elastomer is selected from the group consisting of polyisoprene, polyisobutylene, isobutylene-isoprene copolymer, styrene butadiene rubber as well as combinations thereof.

16. The chewing gum of claim 12 wherein the synthetic resin is selected from the group consisting of polyvinyl acetate, polyethylene, ester gums, polyterpenes, as well as combinations thereof.

17. In a non-chocolate flavored chewing gum comprising a synthetic gum base substantially free of natural gum products, the improvement comprising:
    cocoa powder added to the chewing gum in about between about 0.3 and about 2.4 percent by weight of the synthetic gum base.

18. A method of making non-chocolate flavored chewing gum comprising the steps of:

providing a synthetic chewing gum base which is substantially free of natural gum products;

adding a water soluble portion comprising at least a sweetener;

adding cocoa powder in an amount between about 0.3 and about 2.4 percent by weight of the synthetic gum chewing gum base; and mixing said gum base, water soluble portion, and cocoa powder until a homogenous mass is achieved.

19. The method of claim 18 wherein the cocoa powder is present in an amount between about 0.3 and about 1.2 percent by weight of the synthetic gum base.

20. The method of claim 18 wherein the cocoa powder is present at about 0.6 percent by weight of the synthetic gum base.

21. The method of claim 18 wherein the synthetic elastomer is selected from the group consisting of polyisoprene, polyisobutylene, isoprene-isobutylene copolymer, styrene butadiene rubber, as well as combinations thereof.

22. The method of claim 18 wherein the synthetic resin is selected from the group consisting of polyvinyl acetate, polyethylene, ester gums, polyterpenes, as well as combinations thereof.

* * * * *

UNITED STATES PATENT AND TRADEMARK OFFICE
CERTIFICATE OF CORRECTION

PATENT NO. : 4,889,727
DATED : December 26, 1989
INVENTOR(S) : Jayant C. Dave et al.

It is certified that error appears in the above-identified patent and that said Letters Patent is hereby corrected as shown below:

In column 10, lines 64 and 65, please delete "about between" and substitute therefor --an amount between--.

Signed and Sealed this

Fourteenth Day of July, 1992

Attest:

DOUGLAS B. COMER

*Attesting Officer*     *Acting Commissioner of Patents and Trademarks*

REEXAMINATION CERTIFICATE (2158th)

United States Patent [19]

Dave et al.

[11] B1 4,889,727

[45] Certificate Issued  * Dec. 21, 1993

[54] USING COCOA POWDER TO ENHANCE THE FLAVOR OF SYNTHETIC CHEWING GUM BASE

[75] Inventors: Jayant C. Dave, Bloomingdale; David W. Record, River Forest; Jill M. Nespor, LaGrange; Jeffrey S. Hook, Palos Hills, all of Ill.

[73] Assignee: Wm. Wrigley, Jr. Company, Chicago, Ill.

Reexamination Request:
No. 90/002,487, Oct. 21, 1991

Reexamination Certificate for:
Patent No.: 4,889,727
Issued: Dec. 26, 1989
Appl. No.: 240,832
Filed: Sep. 2, 1988

[*] Notice: The portion of the term of this patent subsequent to Dec. 26, 2006 has been disclaimed.

Certificate of Correction issued Jul. 14, 1992.

[51] Int. Cl.⁵ .............................................. A23G 3/30
[52] U.S. Cl. .......................................... 426/3; 426/6; 426/631; 426/650
[58] Field of Search ........................................ 426/3-6, 426/593, 631

[56] References Cited

U.S. PATENT DOCUMENTS 4,159,347  6/1979  Yoshida et al. ........................ 426/3
4,490,395  12/1984  Cherukuri et al. ..................... 426/3

OTHER PUBLICATIONS

Webster's Ninth New Collegiate Dictionary, 1986, pp. 413 and 763.
Article, "Does Chewing Gum Pass The Taste Test?", *Food Manufacture*, Sep., 1987, pp. 47, 49–50.

*Primary Examiner*—Arthur L. Corbin

[57] ABSTRACT

The present invention includes a method of enhancing the flavor of synthetic chewing gum base by the addition of a minor amount of cocoa powder to the base itself or to the chewing gum in which the base is used. Whether the cocoa powder is added to the gum base or to the chewing gum, the amount of cocoa powder should be between about 0.3 and 2.4 percent by weight of the gum base. The invention also includes the synthetic chewing gum base or a chewing gum with a synthetic gum base with cocoa powder added in a minor amount to enhance the flavor of the gum base. The synthetic gum base of the present invention is substantially free of natural gum products and includes between about 10 and about 30 percent of a synthetic elastomer; between about 20 and about 70 percent of a synthetic resin; and between about 0.3 and about 2.4 percent cocoa powder.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–22 are cancelled.

* * * * *